United States Patent [19]
Murkett et al.

[11] Patent Number: 5,803,534
[45] Date of Patent: *Sep. 8, 1998

[54] PASSENGER CAR WITH A TRANSPARENT TOP ASSEMBLY

[75] Inventors: Stephen Murkett, Gerlingen; Juergen Bayer, Weissach, both of Germany

[73] Assignee: Dr. Ing. h.c.F. Porsche AG, Weissach, Germany

[*] Notice: The term of this patent shall not extend beyond the expiration date of Pat. No. 5,544,934.

[21] Appl. No.: 644,824

[22] Filed: May 10, 1996

Related U.S. Application Data

[63] Continuation-in-part of Ser. No. 324,395, Oct. 17, 1994, Pat. No. 5,544,934.

[30] Foreign Application Priority Data

Oct. 15, 1993 [DE] Germany ............... 43 35 653.2

[51] Int. Cl.⁶ ............................................. B60J 7/047
[52] U.S. Cl. ................... 296/215; 296/217; 296/222
[58] Field of Search .................... 296/215, 216, 296/217, 218, 220, 222, 102

[56] References Cited

U.S. PATENT DOCUMENTS

| | | | |
|---|---|---|---|
| 4,231,608 | 11/1980 | Sorensen | 296/216 |
| 4,659,140 | 4/1987 | Fuerst et al. | 296/217 |
| 4,801,174 | 1/1989 | Hirshberg et al. | 296/216 |
| 4,852,938 | 8/1989 | Hirshberg et al. | 296/214 |
| 4,892,351 | 1/1990 | Ono et al. | 296/216 |
| 5,052,744 | 10/1991 | Sugimoto | 296/217 |
| 5,306,069 | 4/1994 | Becker et al. | 296/217 |
| 5,466,037 | 11/1995 | De Lena | 296/211 |
| 5,544,934 | 8/1996 | Murkett et al. | 296/215 |
| 5,601,330 | 2/1997 | Ulbrich et al. | 296/217 |

FOREIGN PATENT DOCUMENTS

| | | |
|---|---|---|
| 9108228.5 | 1/1992 | Germany . |
| 4222700 C1 | 6/1993 | Germany . |

*Primary Examiner*—Gary C. Hoge
*Attorney, Agent, or Firm*—Evenson Mckeown; Edwards & Lenahan, PLLC

[57] ABSTRACT

A passenger car body includes a top constructed as a roof which covers a passenger compartment above a belt line of the body. So that the occupants have particularly good viewing conditions while the venting of the passenger compartment is good, the removable top has roof frames which bound the side windows and between which—viewed in the longitudinal direction of the vehicle—there extend several transparent roof sections.

31 Claims, 6 Drawing Sheets

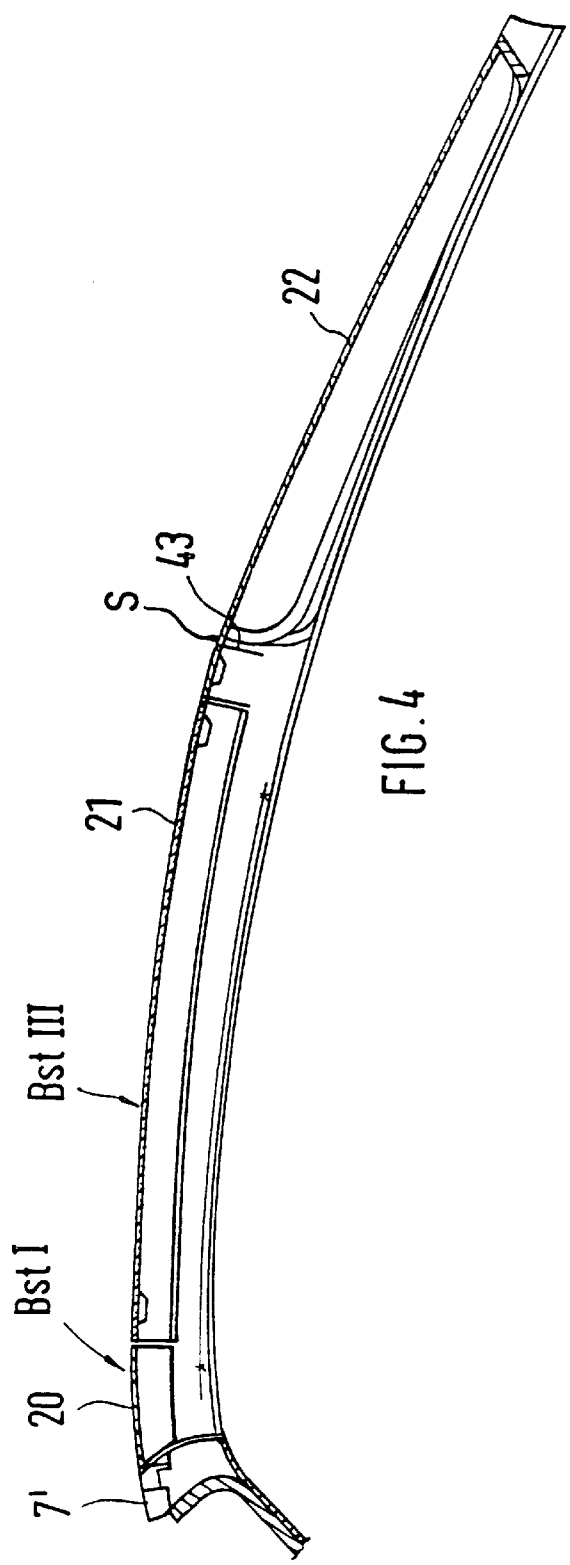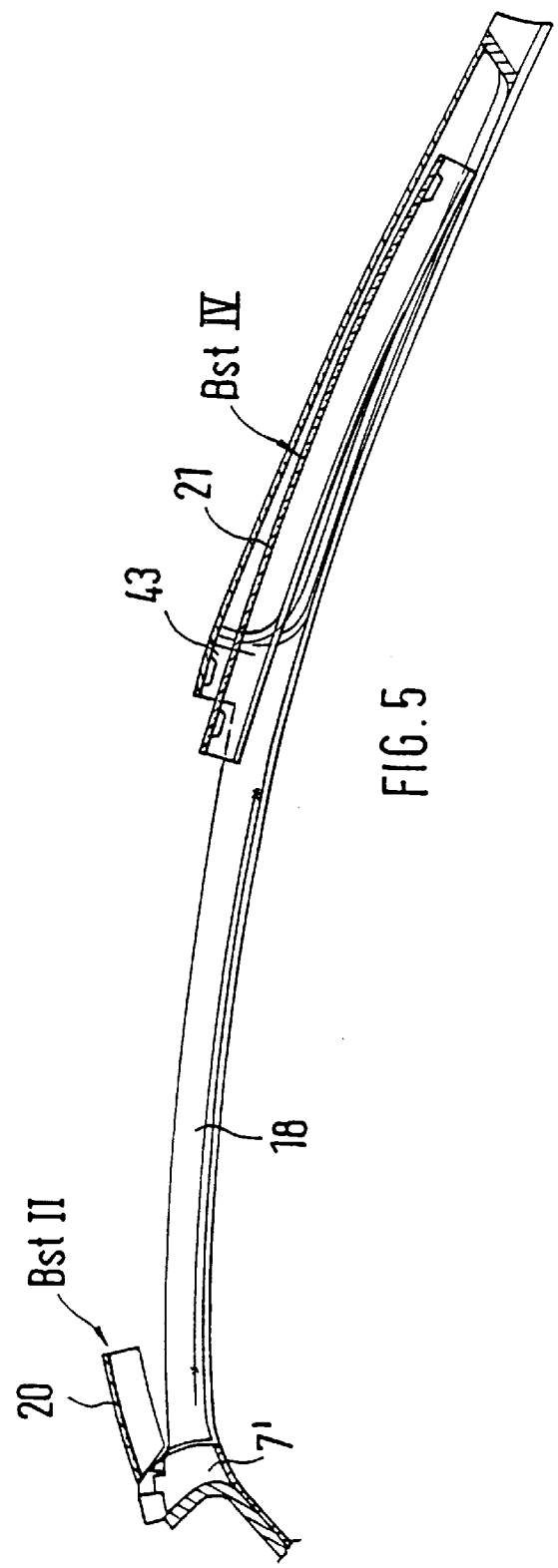

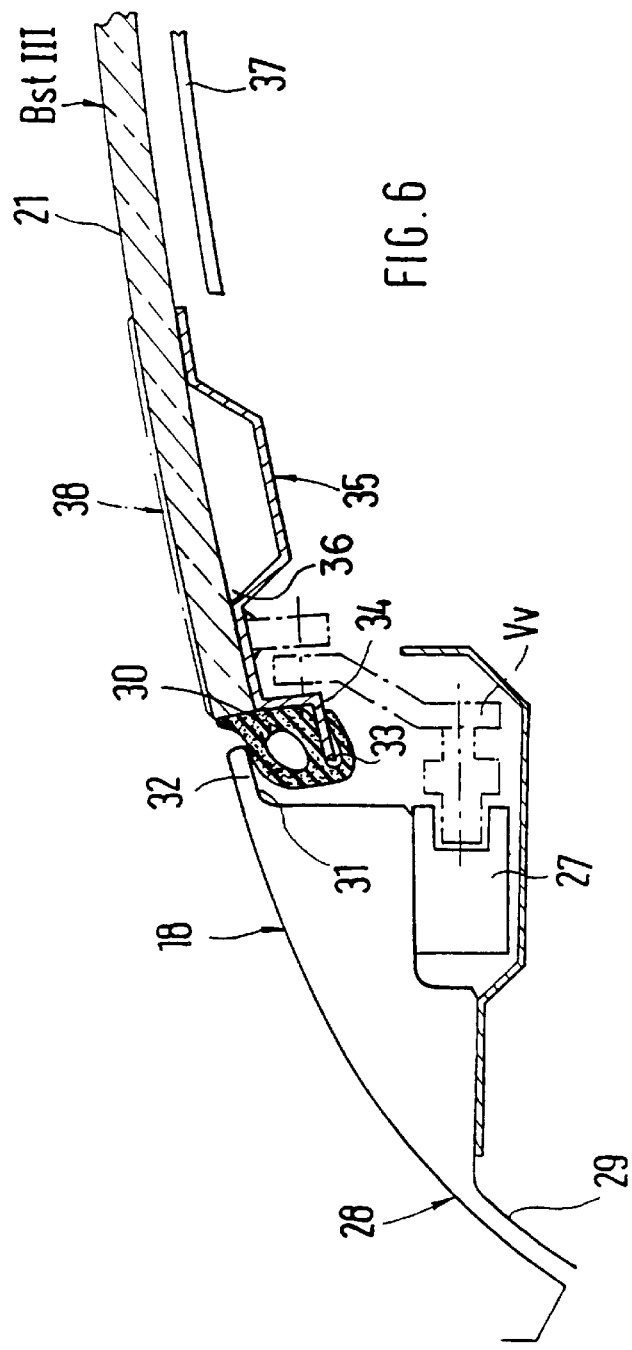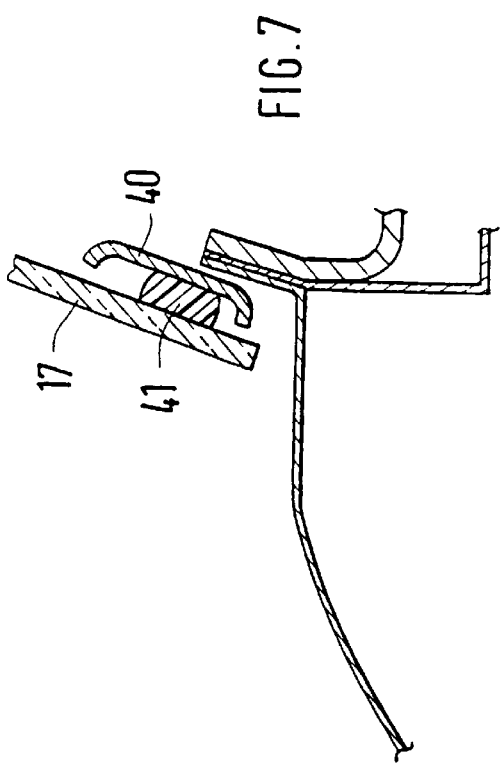

1

PASSENGER CAR WITH A TRANSPARENT TOP ASSEMBLY

This is a continuation of application Ser. No. 08/324,395, filed Oct. 17, 1994 now U.S. Pat. No. 5,544,934.

BACKGROUND AND SUMMARY OF THE INVENTION

This invention relates to a body for a passenger car of the type having a top constructed as a roof covering a passenger compartment above the vehicle body belt line.

From German Patent Document DE 822 658, a passenger car is known which has a top which comprises a closed roof which impairs the view of the occupants to the outside. Analogously, this applies to the coupe top according to German Patent Document DE 11 31 528.

In addition, a motor vehicle roof construction is known according to German Patent Document DE 34 39 880 in which a movable roof section is inserted into an opening of the body.

It is an object of the invention to design a top of the body of a passenger car in such a manner that the occupants' view to the outside is improved and a relatively large roof area can be opened.

According to the invention, this object is achieved by providing an arrangement wherein the top has laterally spaced lateral roof frames, bounding respective side windows, a first angularly movable roof section mounted adjacent to a vehicle windshield frame, an adjoining second longitudinally movable roof section, and a third fixed roof section which forms an extension of the second roof section, said roof sections extending laterally between the lateral roof frames.

The principal advantages achieved by means of the invention are that the top with its roof sections, which may consist of glass and may partially be openable, forms a purpose-oriented combination of a closed and an open body. In this case, it is not only the occupants' upward view which is excellent, for example, for viewing occurrences and landscapes above the roof, but, as a result of the movable roof sections, a good ventilation of the passenger compartment is also achieved, or similar to the situation in an open vehicle, the occupants can see the environment which is presented to them.

The movable roof sections are constructed in the manner of a sliding roof, in which case the first roof section is a wind deflector and the second roof section forms the actual sliding roof. The latter roof section is constructed to be adjustable under the third roof section by means of appropriate kinematics and guides.

The top comprises easily producible frames and supports which may be made of steel, plastic or light metal. The third roof section which, like the other roof sections, is a piece of glass, and the rear side windows are inserted into openings of the removable top and are fastened by means of gluing. As a result of this construction, the top has sufficient stiffness while its weight is acceptable.

Finally, the top, including its essential parts, may be a prefabricated module which is held by means of screwed connections at the vehicle body which may have the frame structure of a convertible. As a result, the top can be fastened to a convertible body without any significant changes so that another variant of the model can be provided by means of relatively low expenditures.

Other objects, advantages and novel features of the present invention will become apparent from the following detailed description of the invention when considered in conjunction with the accompanying drawings.

BRIEF DESCRIPTION OF THE DRAWINGS

FIG. 4 is a sectional view taken along Line IV—IV of FIG. 3;

FIG. 5 is a view corresponding to FIG. 4 showing the sliding roof section in an open position;

FIG. 6 is an enlarged sectional view taken along Line VI—VI of FIG. 1;

FIG. 7 is an enlarged sectional view taken along Line VII—VII of FIG. 1;

DETAILED DESCRIPTION OF THE PREFERRED EMBODIMENTS

Figure 1:
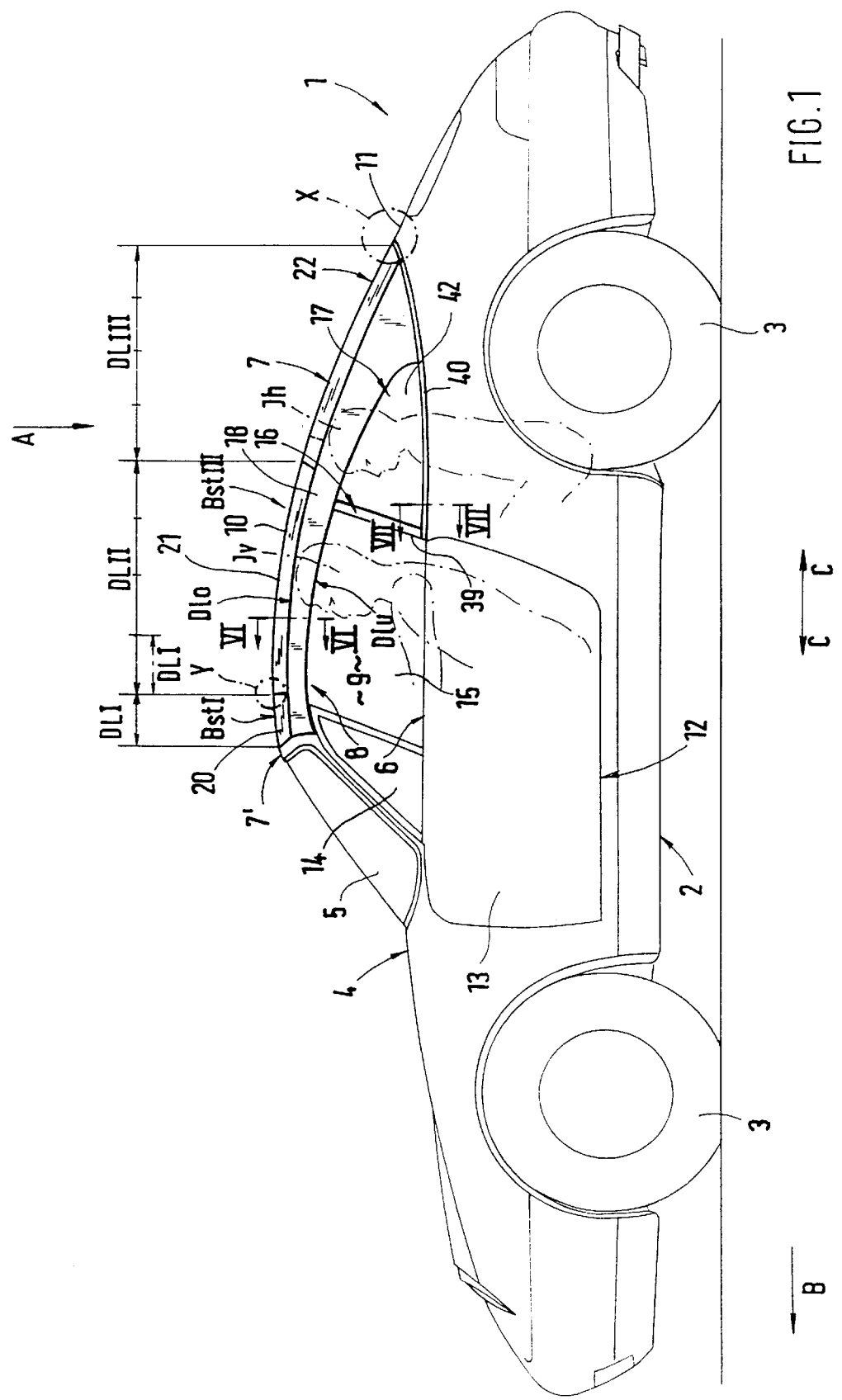
FIG. 1 is a lateral view of a passenger car with the vehicle body according to the invention.

The passenger car 1 comprises a vehicle body 2 which is carried by wheels 3. The body 2 is formed by a basic body 4 comprising a windshield 5 and a belt line 6. The basic body 4 is provided with a top 7 which is connected to an upper windshield frame 7' and the belt line 6 and which covers a passenger compartment 9 by means of a roof 8. A roof line 10, which extends approximately along the longitudinal center plane of the passenger car, extends between the windshield frame 7' and a rear opening 11 in a curve which slopes downward against the driving direction B but is continuous so that the vehicle body 2 has the shape of a coupe with a fast back.

On the longitudinal side of the vehicle, the basic body 4 is in each case provided with a door 12 which comprises a door body 13, a triangular window 14 and a slidable side window 15 whose rear door pane boundary 16 is relatively upright but is slightly sloped against the driving direction B. Another side window 17 is arranged behind the door-side side window 15 on the top 7. The side window 17 has a basic triangular shape and tapers against the driving direction B.

The top 7 has lateral roof frames 18 which bound the side windows 15, 17 and between which a first roof section 20, a second roof section 21 and a third roof section 22 are provided which are situated behind one another viewed in the longitudinal direction C—C of the vehicle. The first roof section 20 is constructed to be angularly movable between the operating positions Bst I and BstII—FIGS. 1 and 2—and, in its upright operating position Bst II, is used as a wind deflector which may be hinged to the roof frame 18 or to the windshield frame 7'. The second roof section 21 is constructed to be longitudinally movable—operating positions Bst III and Bst IV—in the manner of a sliding roof in such a fashion that it can be slid under the third roof section 22, specifically in the operating position Bst IV, the third roof section 22 being fixedly inserted into the removable top 7.

Figure 9:
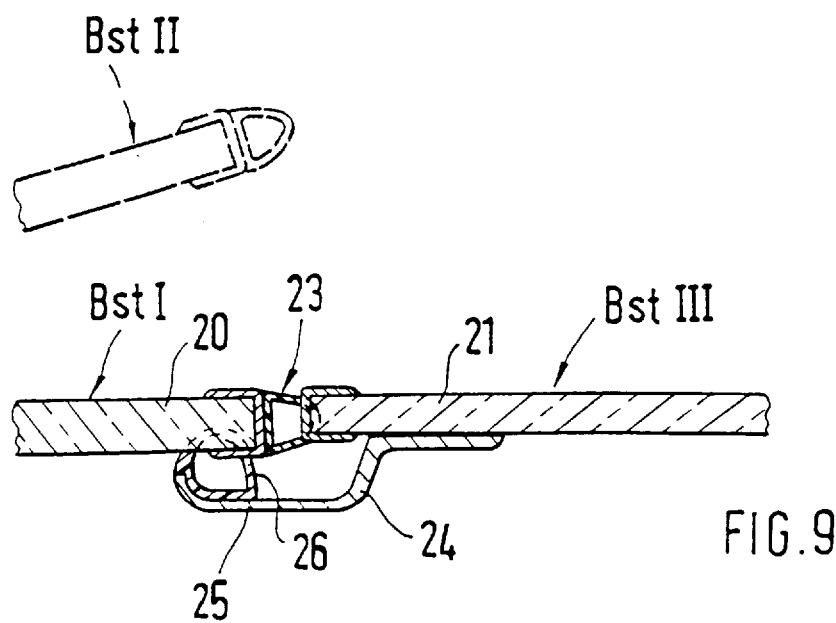
FIG. 9 is an enlarged detail Y of FIG. 1.

In the construction position or basic position, the roof sections 20, 21, and 22 are arranged with respect to one another so that their surfaces are flush, a sealing body 23 being provided between the roof sections 20 and 21 (FIG. 9). In this area, a rail 24 is provided at the bottom side of roof section 21 and reaches under the first roof section 20 by means of a web 25, in which case a seal 26 becomes operative between the web 25 and the first roof section 20.

In order to move the second roof section 21 from operating position Bst III into operating position Bst IV, a guide rail 27 (FIG. 6) is used which is mounted on the roof frame 18. Between the guide rail 27 and the second roof section 21, one or several connecting devices Vv are provided. In FIG. 6, it is shown that the roof frame 18 comprises an outer shell 28 and an inner shell 29, the guide rail 27 being held on the inner shell 29. By means of a sealing body 30, the second roof section 21 interacts with the inner side 31 of a flange 32 which is formed by the outer shell 28 and the inner shell 29. By means of a receiving device 33, the sealing body 30 reaches around a flange 34 of a profiled carrier 35 which is fastened to the bottom side 36 of the second roof section 21 by means of suitable methods and is mounted to be rotating and is used for reinforcing the relatively large-surface roof section 21. The connecting device Vv comprises a lever apparatus which is used for moving the roof section 21, on the one hand, in the longitudinal vehicle direction C—C and, on the other hand, into the operating position Bst IV.

For ensuring a good view for all occupants of the passenger car 1, all roof sections 20, 21 and 22 are made of viewing glass. This may be a multilayered sunshade glass. In addition, photochromic glass is conceivable. Furthermore, a blind 37 (FIG. 6) may be provided on the interior side of the roof sections 20, 21 which, for example, when the vehicle is stopped, can be brought into a closed or covering position. There is also the possibility of tinting the glass, for example, black, on the exterior side of roof section 21 in the area of the support 35 at reference number 38, whereby, on the one hand, the support 35 is covered and, on the other hand, peculiar aesthetic effects can be achieved. The tinting may be provided on all roof sections in a surrounding fashion as an edge.

Figure 2:
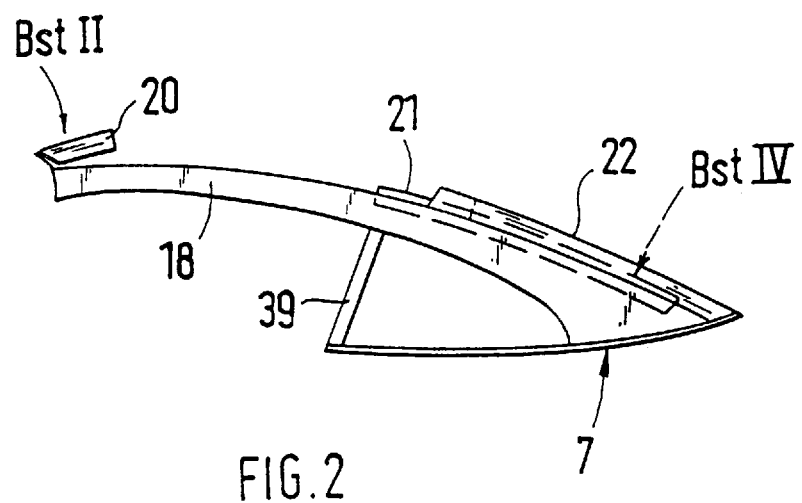
FIG. 2 is a partial view of FIG. 1.
Figure 3:
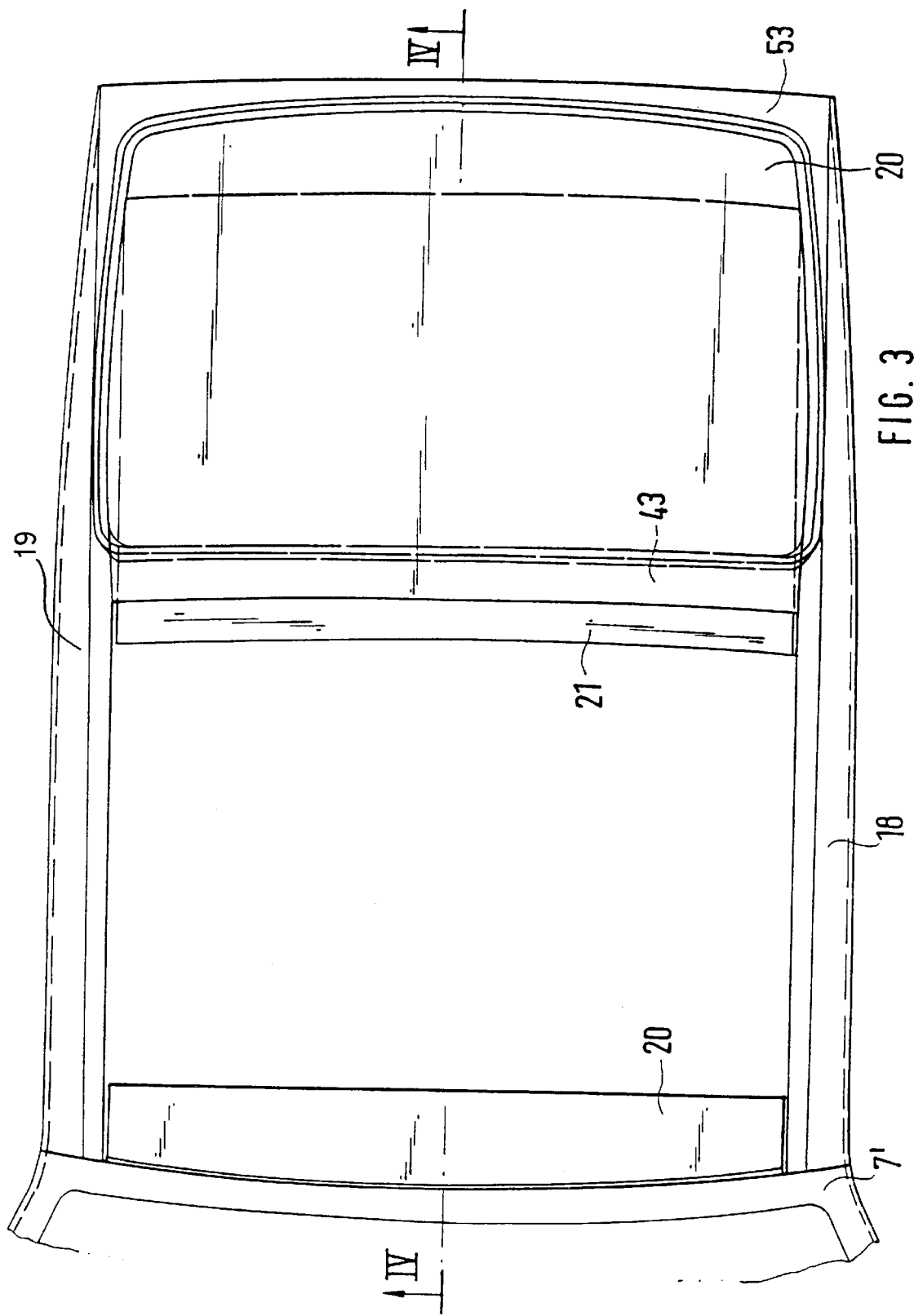
FIG. 3 is a top view in the direction of the arrow A of FIG. 1.

Favorable conditions for the length of the roof sections 20, 21, 22—viewed in the longitudinal direction C—C of the vehicle—are obtained in the case of the passenger car of the present embodiment if the second roof section 21 extends to behind the door window boundary 16 or an area above an occupant of the rear compartment Ih who sits behind an occupant of the front compartment Iv. In this case, the length DL II and DL III of the second roof section 21 and of the third roof section 22 is approximately four times larger than the length DL I of the first roof section 20 (FIG. 1). In addition, roof sections 20 and 21 may be designed to be as wide as possible which results in a relatively narrow and light configuration of the roof frames.

A pillar 39 leads away from the roof frame 18 bounding the roof sections 20, 21, 22 and extends specifically in the area of the rear door pane boundary 16. This pillar 39 leads into a supporting carrier 40, which extends above the belt line 6, of the removable top 7 (FIG. 7) which extends along the belt line 6 between the opposing pillars 39. The supporting carrier 40 has a U-shaped cross-section and holds the side window 17 (FIG. 7) in position by means of an adhesive body 41. The side window 17 is therefore inserted into an opening 42 which is bounded by the lateral roof frame 18 of the pillar 39 and the supporting carrier 40.

The opposing roof frames 18, which according to FIG. 1 expand in their cross-section against the driving direction B, which is indicated by Lines DLo and DLu, in the area of the third roof section 22, specifically adjacent to the second roof section 21, are connected with a cross piece 43 on which the third roof section 22 rests. It is held in position on the top 7 by means of gluing. The roof line 10 and the Line DLo extend approximately at the same distance from one another.

Together with the roof sections 20, 21, 22, the lateral supports 18, 19, the pillars 39, the cross piece 43, the supporting carrier 40 and the rear side windows 17, the top 7 forms a prefabricated module which is connected with the vehicle body 2 or basic body 4 by means of one or several screwed connections 44.

Figure 8:
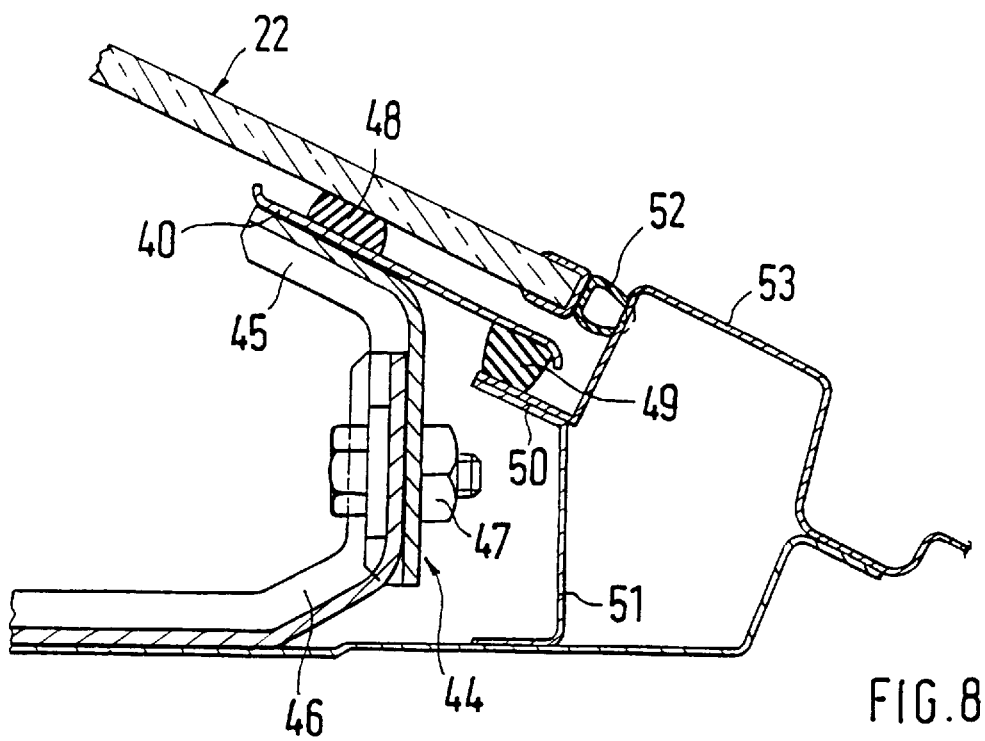
FIG. 8 is an enlarged detail X of FIG. 1.

An embodiment of a screwed connection is illustrated in FIG. 8. Accordingly, the supporting carrier 40 is provided with an angle 45 which extends to another angle 46 of the vehicle body 2. A screw 47 is provided between the two angles 45, 46. Furthermore, on the one hand, the supporting carrier 40 is connected via an adhesive body 48 with the third roof section 22 and, on the other hand, extends by means of a sealing device 49 to a flange 50 of an interior cross piece 51 of the vehicle body 2. Finally, the third roof section 22 adjoins an outer cross piece 53 by means of a sealing body 52.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An automobile body with a roof that covers a passenger compartment above a belt line of the body, said roof comprising:
    first and second roof sections made of transparent material and located one behind the other,
    a third roof section located behind the second roof section,
    said first roof section being movable angle-wise as a wind deflector and said second roof section being designed to be movable beneath the third roof section in the manner of a sliding roof without requiring movement of said third roof section to accommodate movement of the second roof section beneath the third roof section,
    said first and second roof sections being arranged with their surfaces flush with one another when in a closed roof position,
    a sealing body provided at least between the first roof section and the second roof section,
    and an adjustable sunblind provided on the interior of at least the first and second roof sections.

2. Body according to claim 1, wherein the second roof section is movably guided on guide rails mounted adjacent to a roof frame of the body.

3. Body according to claim 1, wherein the second roof section is made of multilayered glass.

4. Body according to claim 1, wherein the first and second roof sections are made of tinted glass for protection against the sun.

5. Body according to claim 1, wherein a rail is provided at least on an underside of the second roof section, said rail fitting beneath the first roof section with a rib when the said first and second roof sections are in a closed roof position.

6. Body according to claim 5, wherein a seal is operative between the rib and the first roof section.

7. Body according to claim 1, wherein at least the second roof section is made as wide as possible with bordering relatively narrow roof frames.

8. Body according to claim 1, wherein an underside of the second roof section is provided with a reinforcing support.

9. Body according to claim 8, wherein said reinforcing support is provided circumferentially on the second roof section.

10. Body according to claim 9, wherein tinting is provided on the outside of the second roof section in the vicinity of the reinforcing support.

11. Body according to claim 2, wherein the roof frame includes narrow longitudinally extending side frame members disposed to maximize the lateral width of the second roof section.

12. Body according to claim 1, wherein said first and second roof sections are made of a glass which is locally provided with coloring.

13. Body according to claim 12, wherein said third roof section is made of glass which is locally provided with coloring.

14. Body according to claim 13, wherein the coloring extends along edges of the first, second and third roof sections.

15. Body according to claim 1, wherein the length of the second roof section is a multiple of the length of the first roof section.

16. Body according to claim 1, wherein the length of the second and third roof sections are approximately the same.

17. Body according to claim 15, wherein the length of the second and third roof sections are approximately the same.

18. Body according to claim 1, wherein the roof exhibits a roof line extending along a central lengthwise plane of the automobile body in a curved arc between a windshield frame and a vehicle rear section.

19. An automobile body with a roof that covers a passenger compartment above a belt line of the body, said roof comprising:

lateral roof frames delimiting vehicle side windows, and first and second roof sections made of transparent material and located one behind the other between the lateral roof frames, said first and second roof sections being wide with corresponding relatively narrow lateral roof frames, said first roof section being adjustable angle-wise as a wind deflector and the second roof section being designed as a sliding roof, said second roof section being movably guided on guide rails which extend adjacent to the lateral roof frames.

20. Body according to claim 18, comprising an adjustable sunblind provided on an inside area of the first and second roof sections.

21. Body according to claim 19, wherein the roof exhibits a roof line extending along a central lengthwise plane of the automobile body in a curved arc between a windshield frame and a vehicle rear section.

22. Body according to claim 19, wherein the length of the second roof section is a multiple of the length of the first roof section.

23. Body according to claim 19, wherein at least the second roof section consists of multilayered glass.

24. An automobile body comprising:

a roof that covers a passenger compartment above a belt line of the body, lateral roof frames delimiting vehicle side windows and forming a roof line that extends approximately along a central lengthwise plane of the automobile body in a curved arc between a vehicle windshield frame and a vehicle rear section; and side windows formed by a first displaceable side window and a second side window that has a basically triangular shape and is mounted behind the first side window;

wherein the roof has first, second, and third roof sections located one behind the other between the lateral roof frames, wherein the roof sections are made as wide with corresponding relatively narrow lateral roof frames, wherein the first roof section is made movable angle-wise as a wind deflector and the second roof section is movable beneath the third roof section in the manner of a sliding roof without requiring movement of said third roof section to accommodate movement of the second roof section beneath the third roof section, wherein the second roof section is movable on guide rails that extend adjacent to the lateral roof frames, and wherein an adjustable sunblind is operable at least on an inside of the first and second roof sections.

25. An automobile body according to claim 24, wherein longitudinal lengths of the second and third roof sections are greater by a multiple than the length of the first roof section.

26. An automobile body according to claim 24, wherein at least the first and second roof sections are made of transparent material.

27. Body according to claim 24, wherein at least the second roof section is made of multilayered glass.

28. Body according to claim 24, wherein the first, second and third roof sections are made of tinted glass for protection against the sun.

29. Body according to claim 24, wherein at least the first and second roof sections are made of glass provided with local coloring.

30. Body according to claim 29, wherein the coloring is provided on edges of the first and second roof sections.

31. Body according to claim 30, wherein said third roof section is also made of glass with local coloring on its edges.

* * * * *